Aug. 28, 1951     C. F. ERN, JR     2,565,552
METHOD OF MANUFACTURING PINKING SHEARS
Filed Oct. 26, 1949
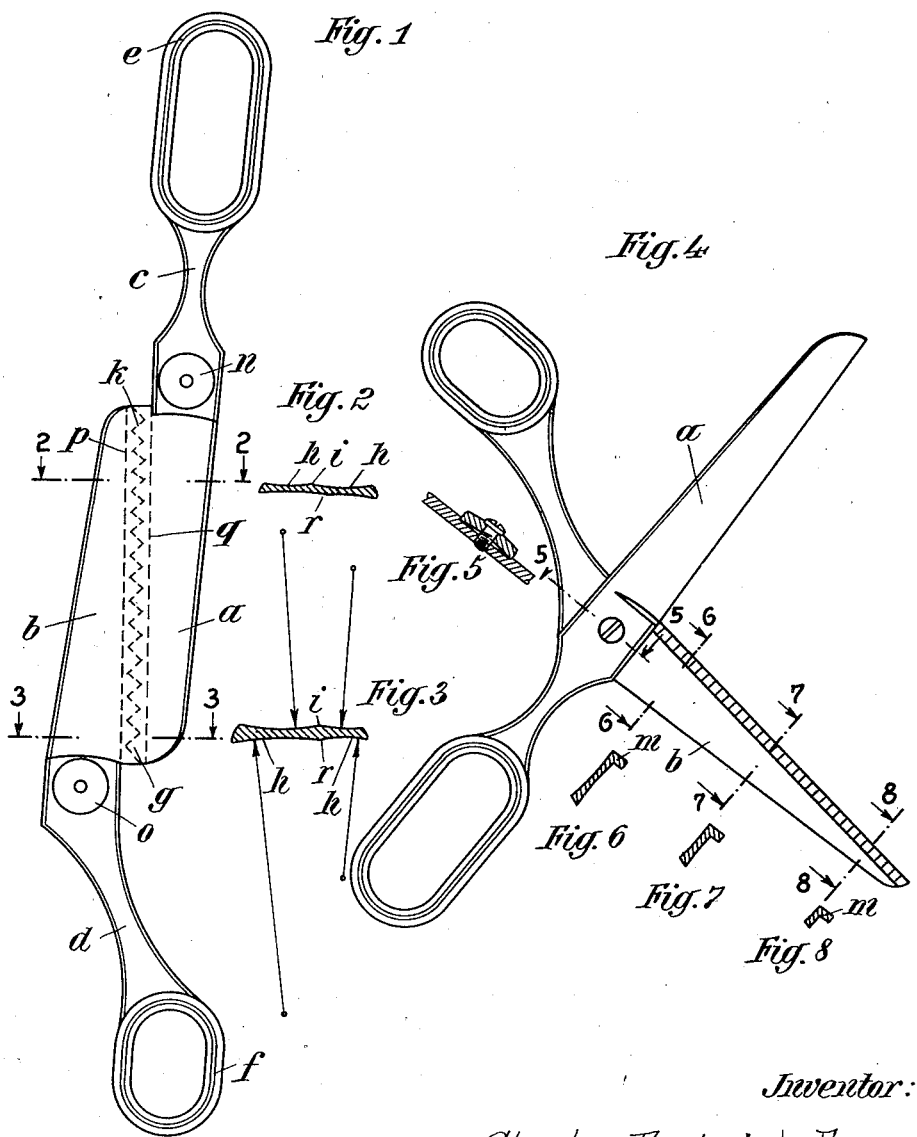
Inventor:
Charles Frederick Ern Jr.

UNITED STATES PATENT OFFICE 2,565,552

METHOD OF MANUFACTURING PINKING SHEARS

Charles Frederick Ern, Jr., White Plains, N. Y.

Application October 26, 1949, Serial No. 123,708
In Germany August 24, 1949

3 Claims. (Cl. 76—104)

My invention relates to a method of manufacturing pinking shears having toothed cutting edges. The production of such shears presents special problems other than the production of ordinary scissors having straight cutting edges located within the plane of motion, since each of the two toothed cutting edges of a pinking shear is located in a plane extending at right angles to the plane of movement.

In the manufacture of cutting tools such as razor blades, scissors and the like having straight cutting edges, it has heretofore been proposed to use a common blank consisting of a strip of sheet metal stamped out for both the blades and the shanks of two cutting members located with their cutting edges cohering to each other along a straight line blank.

The objects of my invention are to provide a process of manufacturing a pinking shear which is simple and inexpensive and involves a minimum of waste of material and time consumption compared with prior methods.

I attain these objects by producing a sheet metal blank having the contour of two adjoining shear sections cohering to one another with their cutting edges, by processing this blank to a semi-finished condition, by subsequently cutting the blank in two along a zig-zag line extending along the boundary of the two sections, and by subsequently shaping each of the two sections by bending the margin having the toothed edge transversely causing it to extend at right angles to the plane of the section.

A preferred embodiment of my invention will be described hereinafter with reference to the accompanying drawing in which Fig. 1 illustrates a blank in semi-finished condition, Figs. 2 and 3 show the cross-sections taken along lines 2—2 and 3—3, respectively of Fig. 1, Fig. 4 is a plan view of the finished pinking shear, Fig. 5 is a partial cross-section taken along this line 5—5 of Fig. 4, and Figs. 6, 7 and 8 are cross-sections taken along lines 6—6, 7—7, and 8—8 of Fig. 4, respectively.

In the first step of manufacture an elongate substantially rectangular sheet metal strip is cut off from a steel band either lengthwise or transversely to serve as the blank from which the two sections of the shear are produced by my novel method. In the latter alternative, the steel band must have a width corresponding to the length of the blank. This sheet metal strip is trimmed substantially along a contour corresponding to that of the blank illustrated in Fig. 1 and holes are punched in the ends thereof to form the handles. The blank so trimmed is then subjected to a drop-forging treatment to give the handles $e$ and the shafts $c$ connecting the handles with the blade portion $a$ and $b$ the proper shape. The drop-forged blank is then trimmed again resulting in a product having the contours shown in Fig. 1.

The central portion of the blank located between the two hinge lugs $n$ and $o$ is then subjected to a grinding process. For this purpose each face of the blank is operated upon by one or more grinding discs, the axes of rotation of the latter extending substantially parallel to the blank. In this manner the central portion of the blank may be given any desired profile. As shown in Figs. 2 and 3, the profile of the upper face of the blank is composed of two adjoining concave arcuate curves $h$ each having the radius indicated. In this manner a central zone extending between the two dotted lines $p$ and $q$ (Fig. 1) is formed with a longitudinal crest or ridge indicated in Figs. 2 and 3 at $i$. Similarly, the lower face has a profile composed of two adjoining arcs forming a similar ridge $r$ extending substantially parallel to and in registry with the ridge $i$. Then holes are drilled through the lugs $n$ and $o$ for the hinge and the handles $i$ and the shafts $c$ are finished by a lapping or burnishing process as is well known in the art. As a result the blank shown in Fig. 1 is obtained.

This blank is then cut in two along the dotted line $k$ thus forming toothed edges. Thereafter the marginal zone of each of the two blade sections $a$ and $b$ is bent transversely along the dotted line $p$ or $q$, respectively, through 90 degrees so as to give the blades the angular profile shown in Figs. 6, 7 and 8 at $m$. The two blade sections so formed are then subjected to another drop-forging process whereby the teeth of the two sections will be so shaped as to readily engage with one another, when the shear is operated. Since the invention is not concerned with the particular shape of the teeth or the toothed cutting edges, this operation need not be dwelled upon. The toothed cutting edges are then hardened and ground and the two sections are assembled by means of a pivot screw shown in Figs. 4 and 5. In Fig. 4 the teeth of the upper blade section $a$ extend downwardly and are, therefore, hidden from view, whereas the upwardly extending teeth of the other plate section $b$ are clearly visible.

In the hardening process the toothed ledges $m$ only are heated and chilled, whereas the main body of the two shear sections *a* and *b* is left unaffected and will therefore retain its proper shape without being liable to distortion.

An important feature of my invention is the grinding operation providing the blank with the concave faces indicated at *h*. In this operation I may use grinding discs of a comparatively small diameter capable of engaging a fraction only of the whole width of each blade section *a* or *b*, respectively, at any time. In this case, the axis of the grinding disc and the blank will be imparted a relative feed motion transversely of the blade so as to produce the arcuate concave faces *h* with the required radii. Preferably, both faces of the blank are simultaneously engaged by two grinding discs. In this event the distance of the axes of the grinding disc may be varied while the blade is given a transverse feeding motion so as to produce the profile shown in Figs. 2 and 3.

From the foregoing description it will appear that my novel process is simple and efficient requiring a minimum of time and material in order to produce a pinking shear of a simple and efficient design. The superiority of my invention will become apparent from a consideration of the prior art. In known methods each of the two sections of a shear or pair of scissors was assembled from a number of pre-fabricated parts welded together or formed from a single blank. Also, a single blank was used having the shape of two cohering blades. This blank was subjected to a drop-forging process and then cut apart whereupon the blades so formed were completed by the welding of handles thereto. Such welding operation, however, is expensive and time consuming.

In my novel process the use of a single blank for the simultaneous production of both shear sections has great advantages, a single die only being required for the drop-forging operation and waste of material and time consumption being reduced to a minimum.

While I have described my invention with reference to a preferred embodiment thereof I wish it to be clearly understood that my invention is not limited to the specific details described herein above but is capable of numerous modifications within the scope of the appended claims.

What I claim is:

1. Method of manufacturing a pinking shear comprising the steps of producing a blank having the contour of two adjoining shear sections cohering along their cutting edges, cutting said blank along a zig-zag line to form said cutting edges, bending the toothed margins of said shear sections at right angles to the planes of said shear sections, shaping the teeth of said shear sections by means of a drop-forging process, hardening the bent marginal portions of said shear sections, grinding the teeth thereof, and assembling the two shear sections by means of a pivot.

2. Method of manufacturing a pinking shear comprising the steps of producing a blank having the contour of two adjoining shear sections cohering along their cutting edges, grinding the faces of the central portion of said blank to produce a profile on each face composed of two concave arcuate portions adjoining at a crest, the crest of the two face profiles being in substantial registry with one another and with said cutting edges, cutting said blank along a zig-zag line to form said cutting edges, and subsequently bending the toothed margins of said shear sections transversely.

3. Method of manufacturing a pinking shear comprising the steps of producing a blank having the contour of two adjoining shear sections cohering along their cutting edges, simultaneously grinding both faces of the central portion of said blank to produce a profile on each face composed of two concave arcuate portions adjoining at a crest, the crest of the two face profiles being in substantial registry with one another and with said cutting edges, cutting said blank along a zig-zag line to form said cutting edges, and subsequently bending the toothed margins of said shear sections transversely.

CHARLES FREDERICK ERN, Jr.

REFERENCES CITED

The following references are of record in the file of this patent:

UNITED STATES PATENTS

| Number | Name | Date |
|---|---|---|
| 306,849 | Memmott | Oct. 21, 1884 |
| 1,565,340 | Treiber | Dec. 15, 1925 |
| 2,002,312 | Hansen | May 28, 1935 |
| 2,204,071 | Dalley | June 11, 1940 |
| 2,284,664 | Kissling | June 2, 1942 |
| 2,395,697 | Kethcart | Mar. 5, 1946 |